United States Patent [19]

Nijholt et al.

[11] Patent Number: 5,485,603
[45] Date of Patent: Jan. 16, 1996

[54] PIPELINE SYSTEM WHICH PAUSES PROCESSING OF ALREADY INPUT DATA DURING DEAD TIME INTERVALS AT THE SYSTEM INPUT

[75] Inventors: Geert Nijholt; Eric H. J. Persoon, both of Eindhoven, Netherlands

[73] Assignee: U.S. Philips Corporation, New York, N.Y.

[21] Appl. No.: 425,302

[22] Filed: Apr. 17, 1995

Related U.S. Application Data

[63] Continuation of Ser. No. 526,852, May 21, 1990, abandoned.

[30] Foreign Application Priority Data

Jul. 14, 1989 [NL] Netherlands .......................... 8901825

[51] Int. Cl.⁶ .................................................... G06F 1/04
[52] U.S. Cl. .................... 395/550; 395/800; 364/DIG. 1; 364/231.8
[58] Field of Search .................................. 395/550, 775, 395/800

[56] References Cited

U.S. PATENT DOCUMENTS 4,916,659  4/1990  Persoon et al. .......................... 395/775
4,965,717  10/1990  Cutts, Jr. et al. ........................ 395/425
5,046,190  9/1991  Daniel et al. ............................. 382/49

OTHER PUBLICATIONS

"The Architechture of Pipelined Computers" P. M. Kogge, Hemisphere Publishing 1981, pp. 30–31.

Primary Examiner—Parshotam S. Lall
Assistant Examiner—Richard L. Ellis
Attorney, Agent, or Firm—Jack D. Slobod

[57] ABSTRACT

An image processing pipeline system and method utilizes a cascade of data processing modules for processing a stream of pixel data units organized in successive groups, which are presented to the system input, the groups being separated from one another by time slots consisting of dead time intervals produced, for example, by line or frame fly-back. The modules are controlled by control signals produced by sampling circuit type characteristic circuits in response to control pulses from a control signal source. The control signals applied to the modules are in synchronism with the presence of data units at the system input, and are absent during the dead time intervals. In order to avoid loss of information due to processing delays if data transport between the modules takes place during an occurrence of a dead time interval, a monitoring circuit stops or pauses processing by the modules during that time interval of data units to reach the system input prior to the interval.

10 Claims, 2 Drawing Sheets

PIPELINE SYSTEM WHICH PAUSES PROCESSING OF ALREADY INPUT DATA DURING DEAD TIME INTERVALS AT THE SYSTEM INPUT

This is a continuation of application Ser. No. 07/526,852 filed May 21, 1990 now abandoned.

BACKGROUND OF THE INVENTION

1. Field of the Invention

The invention relates to a data processing pipeline system and method utilizing a cascade of data processing modules for processing successive groups of data units (units of data), relevant to the processing, which are presented to a system input, said groups being separated from one another by time slots, and a control signal generator for supplying the modules with at least one control signal for controlling the processing by the modules, which control signal occurs in synchronism with the presence of each group at the system input.

2. Description of the Related Art

A pipeline system of this kind is known from European Patent Application EP-A 0285192 which corresponds to commonly owned U.S. Pat. No. 4,916,659. The known pipeline system is an image processing system in which an image is generated by means of the frame scan method. Therein, an image is composed of successive lines, each of which comprises successive pixels. The time slots comprise dead time intervals which are produced, for example by the line fly-back and frame fly-back occurring during image acquisition (see, for example the FIGS. 2 and 3 of EP-A-0285192). In the known system the control signals are applied to the modules in parallel and are delayed in each module by a relevant delay generator in accordance with the cumulative delay incurred by the already processed data due to the processing in the preceding modules. The delay of the control signals maintains synchronization between the data and the control signals.

Even though the known system can be readily reconfigured and has a simple set-up, the solution chosen to solve the synchronization problem implies that each module must be provided with a delay operator for the control signals in order to prevent, for example, the occurrence of time slots from disturbing the data processing.

Another solution for the mutual synchronization of data and control signals could consist in delaying the data per module so that they remain synchronized with the control signals. Like in the previous solution, additional operators are then required for delaying the data. An additional drawback consists in that the overall pipeline processing time is thus increased.

Another solution, for example in the case where the control signals are sampling signals, would be the resampling of the data. This has the drawback that resampling requires additional arithmetic units for interpolation, thus introducing additional processing delays in the system.

SUMMARY OF THE INVENTION

Therefore, it is inter alia an object of the invention to provide a pipeline system of the kind set forth which enables real-time data processing without necessitating the use of additional components such as delay or reconfiguration operators. To achieve this, a pipeline system in accordance with the invention is characterized in that it furthermore includes a monitoring circuit for pausing when the processing by the modules when a time slot occurs at the system input, as long as the control signal is absent. By deactivating the modules (i.e. pausing their processing operations) for the duration of a dead time interval, no data transport takes place between the modules during an interval in which the modules do not receive control signals, for example sampling signals. The presence of dead time in slots between successive groups of data units in that case does not lead to loss of information because the dead time intervals do not, in a manner of speaking, enter the cascade.

It is to be noted that the sole requirement imposed as regards the control signals consists in that these signals must appear in synchronism with the presence of the groups of data units before the data units are entered into the cascade. One method of satisfying this requirement, for example consists in couplings connected between a single control signal source and the respective modules being characteristic filters. The filters transform the source signal into control signals which are appropriate for the respective modules and which are mutually synchronized because they have been derived from the same source signal. This method offers the advantage that the pipeline system requires only one source for the control signal, the mutual synchronization of the control signals being automatically achieved. When a control signal, for example a sampling signal, is of a periodic nature within a processing cycle which is indicated by way of a data valid signal, loss of information is liable to occur if the processing of a block of coherent data units exceeds the boundary between two successive cycles. This possible loss is caused by a phase jump between the control signal at the end of a cycle and the control signal at a beginning of the next cycle. Should such phase jumps occur, the result of a processing operation on a block of data units, within one cycle under the control of the relevant control signal, will differ from the result of the same operation on a further, identical block of data units when the processing operation exceeds the boundary between successive cycles.

Therefore, it is another object of the invention to provide a pipeline system in which the occurrence of further loss of information due to the occurrence of said phase jumps is avoided. To achieve this, a pipeline system in accordance with the invention is further characterized in that a first control signal is a data valid signal which is indicative of a window having a dimension (e.g. length) defining a first number of successive data units relevant to the processing operation, and in that at least one further control signal is periodic with a period equal to a further number of successive data units, the first number being an integer multiple of the further number.

This implies that a phase of the further control signal at an end of each processing cycle equals a phase at a beginning of the subsequent cycle. When the control signal generator supplies different modules with control signals having periods of mutually different lengths, the length of a processing cycle, indicated by the data valid signal, should be equal to a common multiple of the lengths of the relevant periods in order to avoid loss of information due to the occurrence of phase jumps. Preferably, the dimension of the window indicating the data relevant to the processing operation is adjustable. Depending on the desired periods of the control signals, one or more dimensions of the window can be adjusted to the common multiple.

The highest sampling frequency is that at which the data units are supplied. This highest sampling frequency is assumed to be equal to 1 for the sake of convenience. Known systems use the conventional sampling frequencies, for example ½, ¼, ⅛, because therein a cycle has a length amounting to a number of data units equal to a power of 2. In that case, each time, one of 2, 4 or 8 data units is selected for processing. In a pipeline system in accordance with the invention in which the phase continuity is ensured in the described manner, sampling frequencies such as, for example ⅖ and 3/7 are also possible. In that case 2 and 3 data units are selected from 5 and 7 data units, respectively, for processing. Extension to sampling frequencies which are not powers of ½ or multiples thereof increases the range of application of the pipeline system. Successive sampling operations executed at different sampling frequencies (resolutions) can be realised on a real-time basis in a pipeline system in accordance with the invention.

It is to be noted that the lengths of successive processing cycles need not necessarily be identical.

BRIEF DESCRIPTION OF THE DRAWING

The invention will be described in detail hereinafter with reference to drawing; therein

DETAILED DESCRIPTION OF THE PREFERRED EMBODIMENTS

Figure 1:
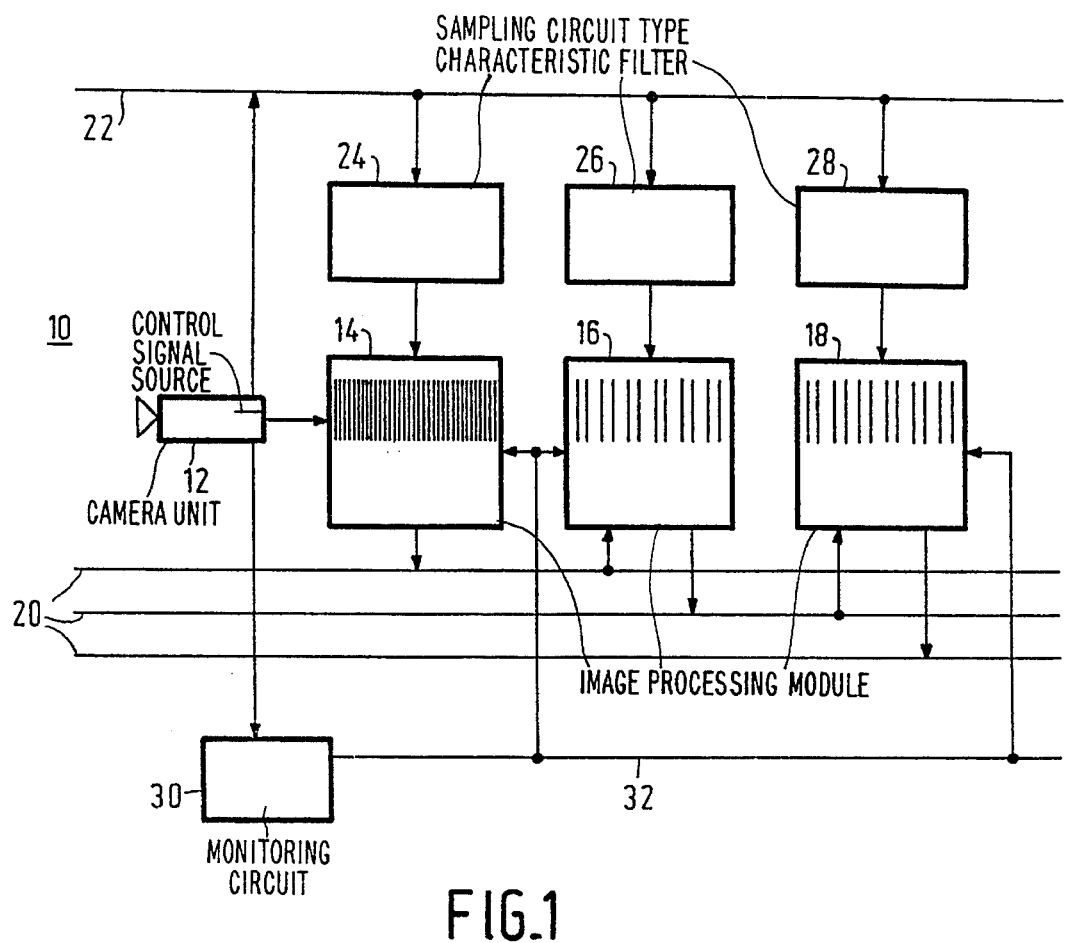
FIG. 1 shows an embodiment of a pipeline system in accordance with the invention.

FIG. 1 shows an embodiment of a pipeline system in accordance with the invention in the form of an image processing system 10 . The input unit of the system is formed by a camera unit 12 which outputs image information in successive image lines with successive pixels to a cascade of image processing modules, three modules 14, 16 and 18 being shown. The modules are connected via a bus 20 for data transport. The image information processed by the module 14 is transported to the module 16 via the bus 20. Similarly, the image information processed by the module 16 is transported to the module 18 via the bus 20. Each module executes a predetermined operation on the image data, which operation is repeated per image or per line. Using a sampling signal, the data appropriate for the relevant operation is selected from the stream of pixels. To this end there is provided a control line 22, fed from a control signal source 13 within camera unit 12, on which clock pulses appear in synchronism with the delivery of pixels by the camera unit. The frequency of these clock pulses is the highest frequency occurring in the system. If the frequency of the sampling signal applied to a relevant module equals the frequency of these clock pulses, the relevant operation has the highest resolution. Execution of operations with a lower resolution is possible by deriving sampling signals of lower frequency from the clock pulses on the control line 22. To this end there are provided sampling circuit type characteristic filters 24, 26 and 28 which are arranged between the control line 22 on the one side and the modules 14, 16 and 18 on the other side and which receive the clock pulses in parallel. The sampling circuit type filters 24, 26 and 28 comprise, for example frequency dividers or clock pulse modulo counters having a predetermined counting range. A clock pulse modulo counter then supplies sampling pulses to the relevant module when it reaches a predetermined count.

A module receives, processes and outputs data in the form of pixels. Processing requires some time: the processing time. Generally low-resolution processing operations require more time than high-resolution processing operations.

Figure 2:
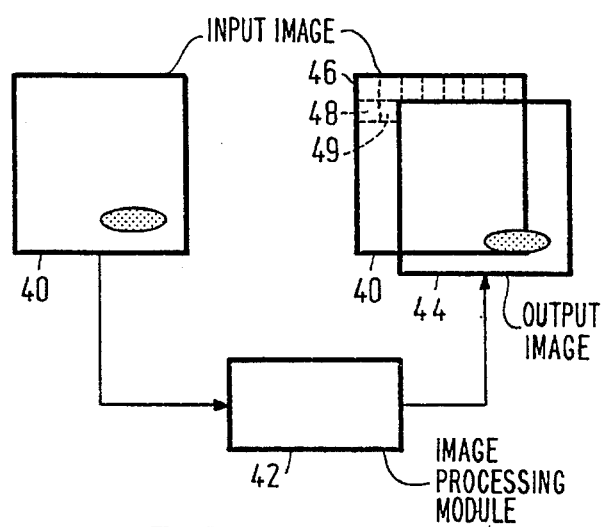
FIG. 2 illustrates the processing delay.

Because of the processing time, the image output by the relevant module has incurred a delay with respect to the image received by the relevant module. This is illustrated on the basis of an example in FIG. 2. An image 40 received by an image processing module 42 is processed and output as an image 447 during this operation it incurs a delay with respect to the image 40. In FIG. 2 the delay equals one image line 46 plus two pixels 48 and 49.

For the sake of clarity it is assumed that the image 40 is the input image to the module 14 in FIG. 1 and that the image 44 is the processed image at the output of module 14. Successive image lines of the image 40 are separated by a line fly-back time, successive images being separated by a frame fly-back time of the camera unit 12. These fly-back times constitute time slots which would propagate through the system together with the processed images. The clock pulses on the control line 22 are synchronized with the stream of pixels on the input of the module 14, These clock pulses are also group-wise separated by time slots. When information relevant to the processing operations of the output image 44, such as the indicated shaded area, is applied to a next module 16 during the occurrence of a time slot, at least a part of said information will not be accompanied by sampling signals derived from the clock pulses, because the sampling signals are applied in parallel to the modules in synchronism with the clock pulse pattern. In order to avoid loss of information, the processing of already inputted data units is stopped or paused during the occurrence of a dead time interval. To this end, the system 10 comprises monitoring circuit 30 which stops the processing by all modules 14, 16 and 18 during the occurrence of a time slot in the absence of control pulses on line 22. The modules receive the monitoring signals via the monitoring lead 32 for this purpose. Because the modules are deactivated (paused) during the occurrence of a dead time interval, this interval will not be noticed by the processing.

The modules 14, 16 and 18 receive sampling signals which recur in line cycles and frame cycles, related to the stream of pixels on the input of the module 14. In the present embodiment the number of pixels, and hence the number of clock pulses on the control line 22, is the same for each line. It follows therefrom that the pattern of sampling signals, derived from the clock pulses by the sampling circuit type filters 24, 26 and 28, is also recurrent in cycles of the same length.

Figure 3:
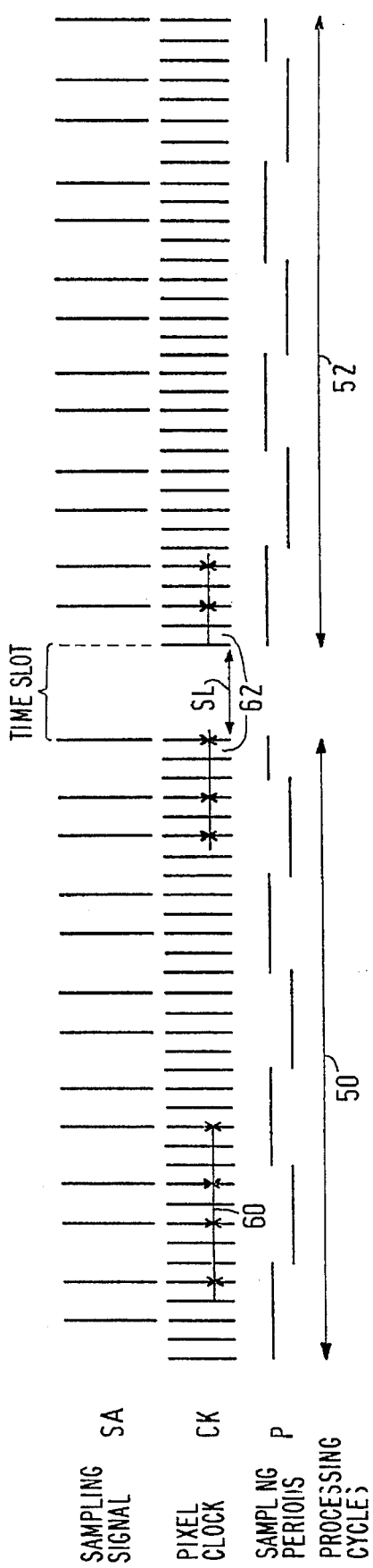
FIG. 3 shows a timing diagram for an embodiment in which loss of information occurs due to the phase jump in the control signal at a transition between successive cycles.

FIG. 3 shows an example of the occurrence of loss of information if the processing of pixels is controlled by means of sampling signals originating from two successive processing cycles. The Figure shows successive processing cycles 50 and 52 of clock pulses CK as they occur on the control lead 22, and of sampling signal SA derived from the clock pulses. The sampling signal SA has a period of five clock pulses (pixels) and comprises two sampling pulses in each period. For the sake of clarity the successive periods of the sampling signal SA are denoted by the reference letter P and successive, staggered bars. The cycles 50 and 52 are separated by a time slot SL in which the processing by the modules is stopped. When the processing is resumed, the beginning of a cycle (52) is identified by the end of the preceding cycle (50).

FIG. 3 also shows an object 60 having a length of ten pixels. When this object is sampled with the sampling signal SA, the pixels denoted by a cross (four pixels) are selected and processed. For as long as processing takes place within a processing cycle, four pixels are selected by the sampling signal SA, regardless of the phase of the signal SA at the beginning of the object 60. Also shown is an object 62 which has the same length and whose processing is interrupted by the time slot SL. An apparent widening of the object then occurs. Upon sampling by the signal SA, five instead of four pixels are selected. It appears as if the object is longer than ten clock pulses. The virtual widening of the object is caused by the phase jump in the sampling signal SA at the transition to a next cycle. A kind of syncope occurs in the regularity of the sampling signal SA.

Figure 4:
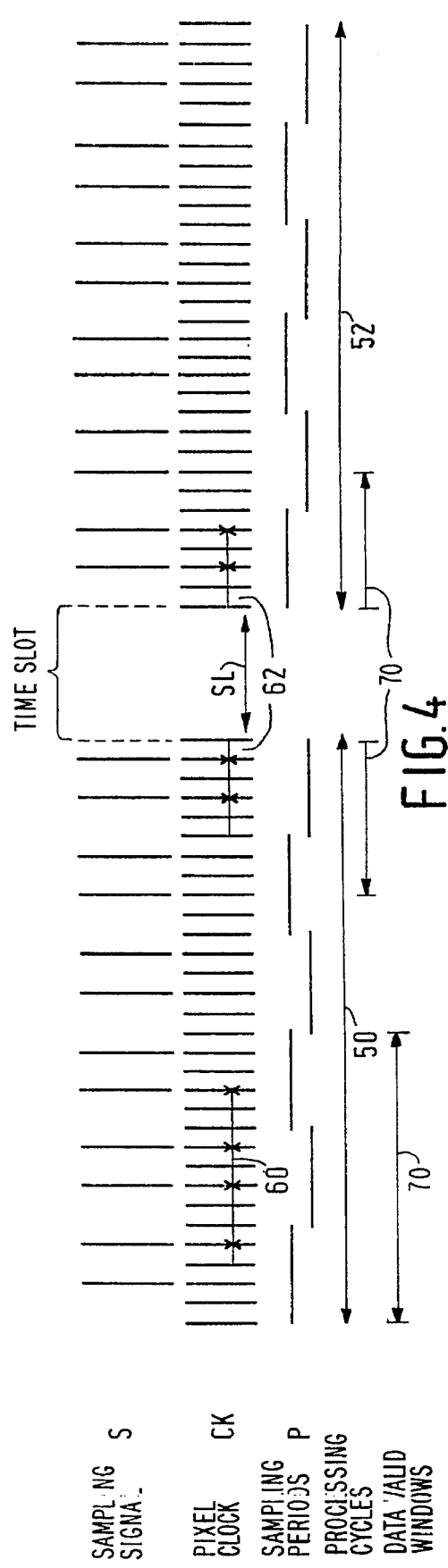
FIG. 4 shows a timing diagram for an embodiment in which loss of information at the transition between successive cycles is avoided.

In FIG. 4, in which attributes corresponding to FIG. 3 are denoted by corresponding references, it is ensured that a processing cycle comprises an integer number of periods of the sampling signal SA, so that the phase of the signal SA at the end of a cycle (50) is the same as the phase at a beginning of a next cycle (52). This avoids the virtual widening or narrowing of an object due to a transition between successive cycles. When mutually different periodic sampling signals are applied to the modules 14, 16 and 18, the described loss of information will not occur, subject to the condition that the cycle length amounts to an integer and common multiple of the length of the periods of these three sampling signals. Further, when a block of successive pixels relevant to the processing is defined by a data valid window which has an adjustable dimension or length 70 (during which a data valid signal (not shown) has a level indicating validity of data) equal to a first number of pixels within a processing cycle, the first number is a preferably an odd integer multiple of the number of pixels in the sampling period P.

It is to be noted that a method as described above can be readily implemented by means of a programmed microprocessor.

We claim:

1. A data processing pipeline system comprising:

a cascade of a plurality of data processing modules for processing successive groups of data units which are presented to a system input at, or upstream of, an input to the cascade, which groups are separated from one another by time slots;

control means for supplying the modules with at least one control signal for controlling processing of data units by the modules, said control signal occurring in synchronism with presence of each group at the system input, said time slots comprising dead time intervals during which said control signal is absent; and monitoring means for, during occurrences of dead time intervals at the system input, pausing all processing by said modules of data units which have already reached the input to the cascade.

2. A data processing pipeline system as claimed in claim 1, wherein said at least one control signal comprises a first control signal which is indicative of a data valid window having a length defining a first number of successive data units to be processed, and at least one further signal which is periodic with a period equal to a further number of successive data units, the first number being an integer multiple of the further number.

3. A data processing pipeline system as claimed in claim 2, wherein the first number is an odd integer multiple of the further number.

4. A data processing pipeline system as claimed in claim 3, wherein the length of the window is adjustable.

5. A data processing pipeline system as claimed in claim 2, wherein the length of the window is adjustable.

6. A data processing pipeline system as claimed in claim 2, wherein the control means comprises a control signal source for supplying a source signal, couplings connected between the control signal source and the respective modules, and a filter in at least one of said couplings in order to derive said at least one control signal from the source signal for the module to which the at least one coupling is connected.

7. A data processing pipeline system as claimed in claim 1, wherein said successive groups of data units are obtained by sampling an image.

8. A data processing pipeline system as claimed in claim 2, wherein said successive groups of data units are obtained by sampling an image.

9. A method of processing successive groups of data units, separated by time slots, in a pipeline structure comprising: controlling said processing with at least one control signal which occurs in synchronism with the groups of data units as they appear at a point at, or upstream of, an input to the pipeline structure, in a manner that all processing of data units which have already reached the input to the pipeline structure is stopped during occurrences of the time slots at said point while the control signal is absent.

10. A method as claimed in claim 9, wherein said controlling is with a first control signal which is a data valid signal indicative of a window having a length defining a number of successive data units forming a group, and with at least one further control signal which is periodic with a period equal to a further number of data units, the first number being an integer multiple of the further number.

* * * * *